US009609319B2

(12) United States Patent
Ahuja et al.

(10) Patent No.: US 9,609,319 B2
(45) Date of Patent: Mar. 28, 2017

(54) DETECTION, LOCATION, AND PROCESSING OF STATIC PIXELS (75) Inventors: Nilesh Ahuja, Chandler, AZ (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1108 days.

(21) Appl. No.: 13/543,786

(22) Filed: Jul. 6, 2012

(65) Prior Publication Data
US 2014/0010302 A1  Jan. 9, 2014

(51) Int. Cl.
*H04N 19/513* (2014.01)
*H04N 19/51* (2014.01)
*H04N 19/107* (2014.01)
*H04N 19/14* (2014.01)
*H04N 19/182* (2014.01)
*H04N 19/196* (2014.01)

(52) U.S. Cl.
CPC ..... *H04N 19/00587* (2013.01); *H04N 19/107* (2014.11); *H04N 19/14* (2014.11); *H04N 19/182* (2014.11); *H04N 19/198* (2014.11); *H04N 19/51* (2014.11)

(58) Field of Classification Search
CPC ........... H04N 19/00587; H04N 19/107; H04N 19/14; H04N 19/182; H04N 19/198; H04N 19/51; H04N 19/513; H04N 19/527; H04N 19/517

USPC ........................................ 375/240.01–240.29
See application file for complete search history.

(56) References Cited

U.S. PATENT DOCUMENTS

| | | | | |
|---|---|---|---|---|
| 5,341,224 A | * | 8/1994 | Eschbach | 358/3.27 |
| 6,404,461 B1 | * | 6/2002 | Le Clerc | 348/700 |
| 2004/0022323 A1 | * | 2/2004 | Kelly et al. | 375/240.29 |
| 2007/0064014 A1 | * | 3/2007 | Piek | 345/629 |

OTHER PUBLICATIONS

Daehyun Kim et al., "Static text region detection in video sequences using color and orientation consistencies," ICPR 2008, Dec. 2008, pp. 1-4.
Huiping Li et al., "Automatic text detection and tracking in digital video," IEEE Transactions on Image Processing, Jan. 2000, pp. 147-156, vol. 9, Issue 1.

* cited by examiner

*Primary Examiner* — Sath V Perungavoor
*Assistant Examiner* — Nathnael Aynalem
(74) *Attorney, Agent, or Firm* — Jordan IP Law, LLC (57) ABSTRACT

Systems and methods may provide for the detection, location, and processing of static pixels during video processing. In one example, the method may include determining if a color component value of a pixel located at a pixel location remains constant between a first frame and a next frame, determining if the pixel is a low-difference pixel, calculating a motion-compensation error of the color component, determining if the motion compensation error of the color component is large, and generating a map of static pixels including the pixel.

28 Claims, 7 Drawing Sheets

DETECTION, LOCATION, AND PROCESSING OF STATIC PIXELS

BACKGROUND

Technical Field

Embodiments generally relate to video data processing. More particularly, embodiments relate to the detection, location, and processing of static pixels during video processing.

Discussion

Motion-compensated video processing may typically be highly computationally-intensive. One way to curtail complexity may be to use block-based processing techniques. Block-based motion estimation/compensation (ME/MC) techniques may assume that all pixels lying within a block share the same motion vector.

In some cases, the video block may include a static graphic overlay (e.g., a subtitle, a logo, etc.), in which case it may be important to preserve the static nature of the overlay from one video frame to the next. However, if not properly detected, differences in the processing requirements of a static region and a non-static region (e.g., content) may lead to processing errors.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
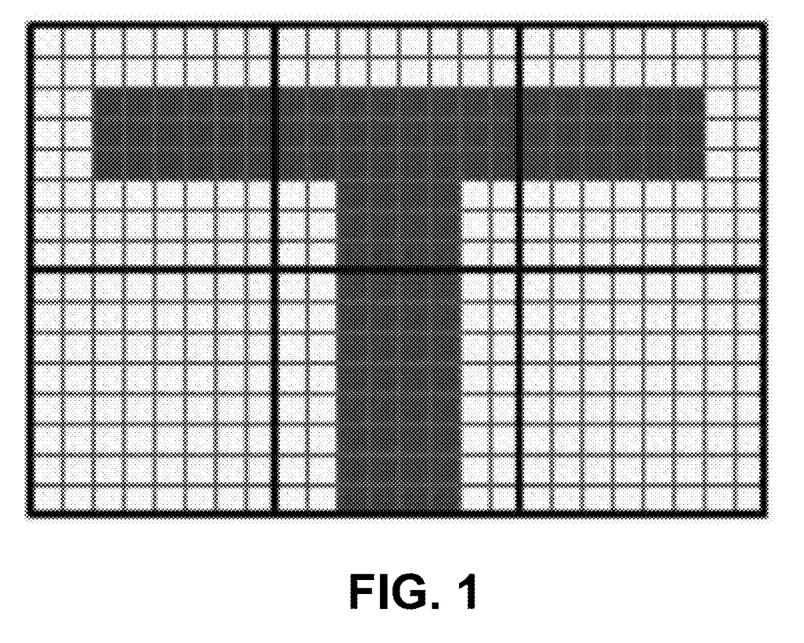
FIG. 1 is an illustration of an example of a video frame according to an embodiment.

Embodiments relate to the detection, location, and processing of static pixels during video processing. FIG. 1 illustrates an example of a video frame 100 in which an upper-half of the alphabet letter 'I' is shown. The letter may be a portion of an overlay (e.g., a subtitle, a logo, etc.), and the background may be from a video file including moving content. In this case, differences in the processing requirements of a static pixel (i.e., of the overlay) and a non-static pixel (i.e., of the moving content) may require detecting and locating the static pixel in the video block on a per-pixel basis, and processing the static pixel differently than a non-static pixel. The detection, location, and processing may be based on, among other things, the following three properties.

First, the video processing may be directed to locating pixels whose color component values remain unchanged for a plurality of video frames. Color component values may be used to represent and reconstruct a frame of video. In one color scheme, the color components of a color space may be described using luma and chroma values. Luma (or luminance) may represent the brightness of an image, while chroma (or chrominance) may represent the color of an image. The luma value may be described by the symbol Y, while the chroma values may be described by the symbols $C_b$, $C_r$.

Second, the video processing may be directed to detecting a "strong edge". A strong edge may form when an overlay (e.g., a subtitle, a logo, etc.) may be placed on top of a moving video portion. As will be discussed in greater detail, the video processing may be configured to detect a strong edge associated with a static region (e.g., a text overlay) by detecting a large gradient value.

Third, the video processing may be directed to detecting a pixel with a large frame-to-frame motion compensation error. A large frame-to-frame motion compensation error may result when a non-zero motion vector of a moving background gets imparted to a static feature. The motion compensation error for a pixel location may be based on a motion vector associated with the location.

Figure 2:
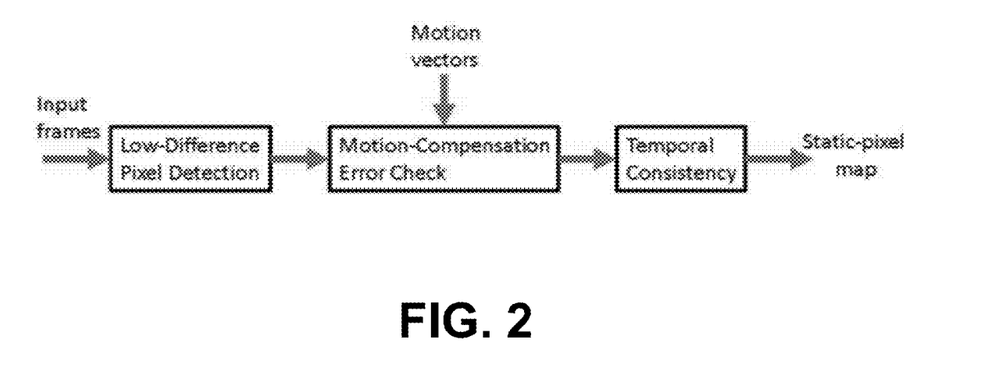
FIG. 2 is a flowchart of an example of a first method of generating a map of static pixels according to an embodiment.

Turning now to FIG. 2, a flowchart is shown of an example of a method of generating a map of static pixels according to an embodiment. As shown, the method may include analysis of an input frame to detect pixels whose color component values remain unchanged for a plurality of video frames (i.e., low-difference pixels). Next, the method may include using motion vectors associated with the detected pixels to perform a motion-compensation error check. Furthermore, the method may include analysis pertaining to a previous input frame to introduce temporal consistency. Finally, the method may include generation of the map of static pixels.

Figure 3:
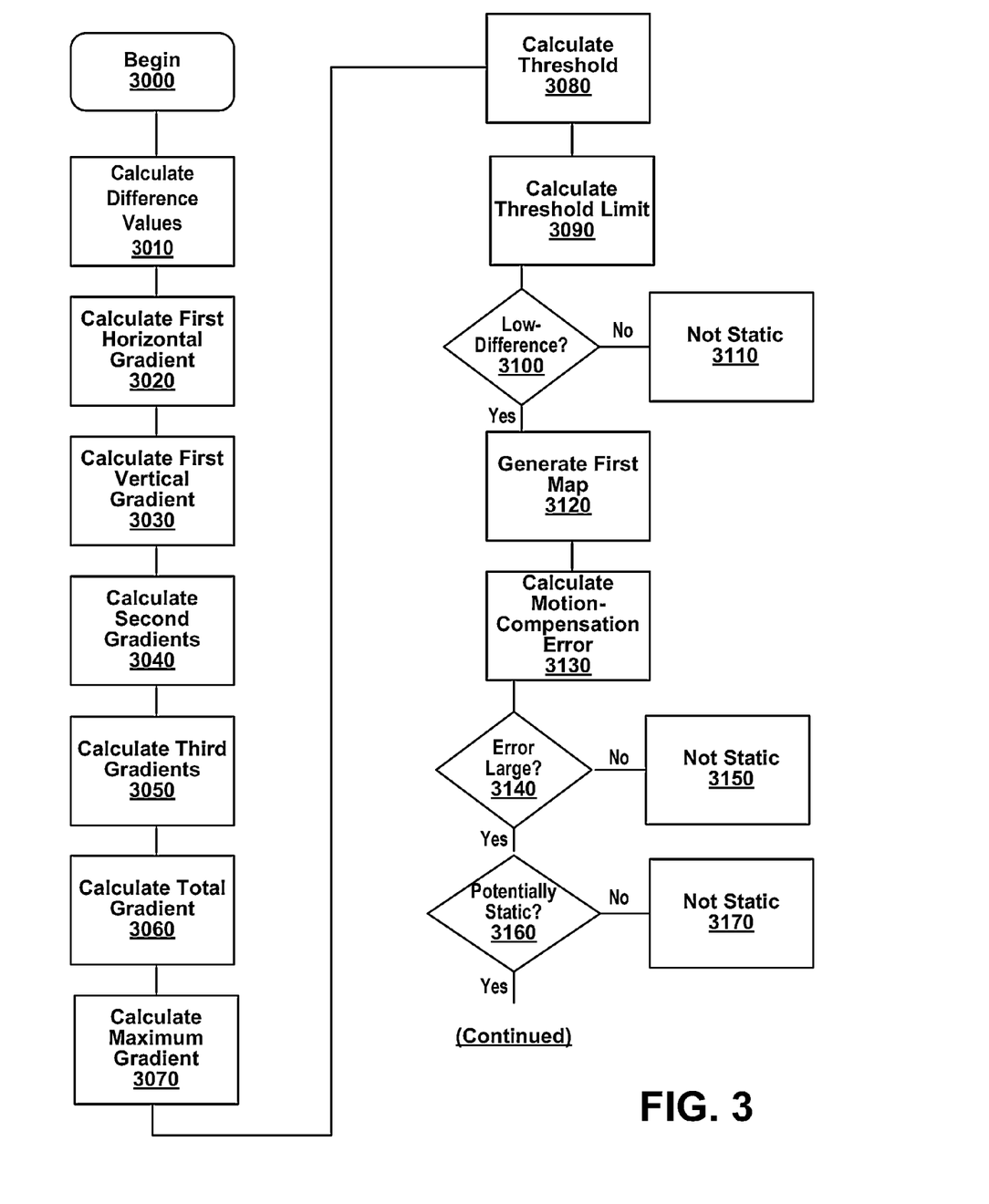
FIG. 3 is a flowchart of an example of a second method of generating a map of static pixels according to an embodiment.

Turning now to FIG. 3, a flowchart is shown of an example of a method of detecting and locating a static pixel in a video block on a per-pixel basis, generating a map of static pixels, and processing the static pixels differently than a non-static pixel. In this example, a processing application may analyze pixel characteristics (e.g., color component values) of a pixel located at coordinates (i,j) to determine if the pixel is a static pixel, and process it accordingly.

The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages. The process may begin at processing block 3000.

At processing block 3010, the processing application may determine if the color component values (Y, $C_b$, $C_r$) of the static pixel remain constant between two frames, N and N+1, by calculating a difference value for each of the color components. So, in this instance, the difference in luma value Y between the two frames, described as $\text{diff}_Y$, may be calculated as follows:

$$\text{diff}_Y = |Y_N(i,j) - Y_{N+1}(i,j)|.$$

The difference in a first chroma value $C_b$ between the two frames, described as $\text{diff}_{Cb}$, may be calculated as follows:

$$\text{diff}_{Cb} = |Cb_N(i,j) - Cb_{N+1}(i,j)|.$$

The difference in chroma values $C_r$ between the two frames, described as $\text{diff}_{Cr}$, may be calculated as follows:

$$\text{diff}_{Cr} = |Cr_N(i,j) - Cr_{N+1}(i,j)|.$$

Next, the processing application may compare these difference values to a threshold to determine if the pixel values remain approximately constant between the two frames. However, in this example, instead of utilizing a fixed threshold, the processing application may utilize a threshold based on a local gradient. Utilizing a threshold based on a local gradient may allow the processing application to detect a pixel with a large gradient value. As discussed above, a large gradient value may correspond to a strong edge. A strong edge may the result of, for example, a static overlay (e.g., a subtitle).

Accordingly, at processing block 3020, the processing application may calculate a horizontal gradient $\text{Grad}_H(i,j)$ and a vertical gradient $\text{Grad}_V(i,j)$ for each color component. The horizontal gradient of the luma value (Y) may be described as follows:

$$\text{Grad}_{YH}(i,j) = Y(i,j) * \text{Sobel}_H$$

wherein, the '*' denotes two-dimensional convolution, and $$\text{Sobel}_H = \begin{bmatrix} 1 & 2 & 1 \\ 0 & 0 & 0 \\ -1 & -2 & -1 \end{bmatrix}.$$

At processing block 3030, the processing application may calculate the vertical gradient of the luma value (Y), which may be calculated as follows:

$$\text{Grad}_{YV}(i,j) = Y(i,j) * \text{Sobel}_V$$

wherein, the '*' denotes two-dimensional convolution, and $$\text{Sobel}_V = \begin{bmatrix} 1 & 0 & -1 \\ 2 & 0 & -2 \\ 1 & 0 & -1 \end{bmatrix}.$$

At processing block 3040, the processing application may calculate a horizontal gradient $\text{Grad}_H(i,j)$ and a vertical gradient $\text{Grad}_V(i,j)$ of the first chroma component ($C_b$) in a similar manner.

At processing block 3050, the processing application may calculate a horizontal gradient $\text{Grad}_H(i,j)$ and a vertical gradient $\text{Grad}_V(i,j)$ of the second chroma component ($C_r$) in a similar manner as well.

At processing block 3060, the processing application may calculate a total gradient, $\text{Grad}(i,j)$. The total gradient Grad (i,j) may be the sum of all of the gradients calculated.

At processing block 3070, the processing application may calculate a maximum gradient, $\text{GradMax}(i,j)$, which may be the maximum gradient value found within a neighborhood surrounding the pixel (e.g., a 3×3 pixel block).

At processing block 3080, the processing application may utilize a threshold, Th(i,j), to determine if the pixel values remain approximately constant between the two frames. The threshold may be based on the maximum gradient, and may be calculated as follows:

$$Th(i,j) = \text{Gain} \cdot \text{GradMax}(i,j) + \text{Offset}$$

The Gain value and the Offset value may be controllable parameters introduced to ensure that the calculation may be particular to the region the pixel is located in.

At processing block 3090, the processing application may place an upper limit on the value of a threshold, described as $Th_{max}$. The upper limit on the value of the threshold may be calculated as follows:

$$Th(i,j) = Th_{max} \text{ if } Th > Th_{max}.$$

At processing block 3100, the processing application may determine if the pixel is a low-difference pixel. As discussed above, a pixel may be a low-difference pixel if each of the color component differences (i.e., $\text{diff}_Y$, $\text{diff}_{Cb}$, and $\text{diff}_{Cr}$) is lower than the threshold value. The compound condition may be expressed as follows:

$$LowDiff(i,j) = 1; \quad \text{diff}_Y < Th(i,j) \text{ and } \text{diff}_{Cb} < Th(i,j) \text{ and } \text{diff}_{Cr} < Th(i,j)$$
$$= 0; \quad \text{otherwise}$$

If the pixel is not a low-difference pixel, then at processing block 3110, the pixel may be determined to be not static. If on the other hand, the pixel is a low-difference pixel, then at processing block 3120, the processing application may gather pixel locations where each of these values is lower than the threshold value, including the pixel location (i,j), and generate a first binary map of low-difference pixels.

At processing block 3130, the processing may calculate a motion-compensation error for the pixel identified as a low-difference pixel. As discussed above, the motion compensation error for a pixel location may be based on the motion vector associated with the location. So, for example, in the case of a motion vector ($V_x(i,j), V_y(i,j)$) at the location (i,j), the processing application may calculate the motion compensation error (diffMC) of the luma value (Y) as follows:

$$\text{diffMC}_Y = |Y_N(i,j) - Y_{N+1}(i - v_X(i,j), j - v_Y(i,j))|$$

The processing application may calculate a motion compensation error of the first chroma component ($C_b$) as follows:

$$\text{diffMC}_{Cb} = |Cb_N(i,j) - Cb_{N+1}(i - v_X(i,j), j - v_Y(i,j))|$$

The processing application may calculate a motion compensation error of the second chroma component ($C_r$) as follows:

$$\text{diffMC}_{Cr} = |Cr_N(i,j) - Cr_{N+1}(i - v_X(i,j), j - v_Y(i,j))|$$

At processing block 3140, upon determining the motion compensation error of each of the color components, the processing application may determine whether a motion compensation error, MCError is considered to be large by comparing them to an error threshold.

So, in this example, the processing application may compare the $\text{diffMC}_Y$ with a threshold for the luma component $\text{MCth}_Y$, and may compare both the $\text{diffMC}_{Cb}$ and the $\text{diffMC}_{Cr}$ with an error threshold for a chroma component, MCth$_C$. If any one of these motion compensation errors is found to be greater than the relevant threshold, the processing application may find the motion compensation error to be large. This compound condition may be expressed as follows:

diffMC$_Y$>MCth$_Y$ or diffMC$_{Cb}$>MCth$_C$ or diffMC$_{Cr}$>MCth$_C$

If the motion compensation error for the pixel is not found to be large, then at processing block 3150, the pixel may be determined to be not static.

If on the other hand, the motion-compensation error for the pixel is found to be large, then at processing block 3160, the processing application may determine whether the pixel located at (i,j) may be potentially static. In this example, in order to find the pixel to be potentially static, the processing application may require three determinations.

First, the processing application may determine if the motion compensation error for the pixel is large (i.e., as previously calculated in processing block 3130).

Second, the processing application may determine if the pixel is classified as a low-difference pixel for the current frame, N (i.e., as previously calculated in processing block 3100).

Third, in order to introduce temporal consistency, the processing application may determine if the pixel is classified as a low-difference pixel for the previous frame, N−1, as well.

If each of these conditions is found to be true, then the pixel may be potentially static. If each of these conditions is not satisfied, the pixel may not be a static pixel. This compound condition may be expressed as follows:

$$PS(i,j) = \begin{cases} 1; & MCerror \text{ is large and } LowDiff_N(i,j)=1 \text{ and } LowDiff_{N-1}(i,j)=1 \\ 0; & \text{otherwise} \end{cases}$$

The motion-compensated location corresponding to location (i,j) may be (i−v$_x$(i,j), j−v$_y$(i,j)). More generally, in the case of a potentially static pixel PS(i−v$_x$(i,j), j−v$_y$(i,j)) and a frame at hand (i.e., a destination location), the compound condition may be expressed as:

MCerror is large and LowDiff$_N$(i−v$_X$(i,j), j−v$_Y$(i,j))=1 and LowDiff$_{N−1}$(i−v$_X$(i,j), j−v$_Y$(i,j))=1.

If the pixel is not found to be potentially static, then at processing block 3170, the pixel may be determined to be not static.

If on the other hand, the pixel is found to be potentially static, then at processing block 3180, the processing application may gather pixel locations that potentially may be static, including the pixel location (i,j), and generate a second binary map of potentially static pixels.

At processing block 3190, the processing application may apply a cleaning operation to the second map (e.g., a binary map) of potentially static pixels to remove spurious false positive designations. In one example of a cleaning operation, the processing application may first count the number of positive designations of potentially static pixels in a neighborhood. (e.g., a 3×3 pixel block) centered around the pixel located at the pixel location (i,j).

Next, if the number of positive designations is greater than a predetermined high-threshold, then the pixel located at (i,j) may be output as a potentially static pixel. Otherwise, if the number of positive designations is less than a predetermined low-threshold, then the pixel located at (i,j) may be output as not a potentially static pixel. The pseudo code below reflects an example implementation of such an approach.

Input: Binary image.
Output: Cleaned binary image.
For each input pixel (i,j).
Count number of 1's in 3×3 window centered at (i,j).
If number of 1's is greater than a high-threshold (HTH), output pixel at (i,j)=1
Else if number of 1's is less than LTH, output pixel at (i,j)=0.

In other embodiments, a processing application may implement a different cleaning operation.

At processing block 3200, the processing application may generate a third (and final) map of static pixels. At processing block 3210, the processing application may determine if the motion estimation/compensation (ME/MC) portion of video processing is being performed in one direction, or is bi-directional (i.e., backward and forward).

If the processing is performed in one direction, then at processing block 3220, the processing application may generate a final static pixel map, SM$_N$, utilizing a bit-wise AND operation to combine a potentially static map associated with a first frame, N (e.g., as calculated in processing block 3180), and a potentially static map associated with a next frame, N+1 (e.g., as calculated in processing block 3180). This operation may be described as follows:

SM$_N$(i,j)=PS$_N$(i,j) & PS$_{N−1}$(i,j)

where "&" may indicate a bit-based logical AND operation.

If, on the other hand, the processing is based on a bi-directional ME/MC scheme, the at processing block 3230, the processing application may generate a first, "forward" map of potentially static pixels, PS$^F$, and a second, "backward" map of potentially static pixels, PS$^B$. That is, in the case of a frame, N, the forward map of potentially static pixels and the backward map of potentially static pixels may described as follows:

PS$_N^F$(i,j) and PS$_N^B$(i,j)

The processing application may generate a final static map utilizing a bit-wise AND operation, along with bit-wise OR operation.

First, a forward map of potentially static pixels, and a backward map of potentially static pixels for a frame N may be combined using an OR operation. Second, a forward map of potentially static pixels, and a backward map of potentially static pixels for a frame N−1 may be combined using an OR operation. Third, the products of these two OR operations may be combined using an AND operation to generate a final static pixel map, SM$_N$, with respect to the bidirectional scheme. The operation may be described as follows:

SM$_N$(i,j)=(PS$_N^F$(i,j)|PS$_N^B$(i,j)) & (PS$_{N−1}^F$(i,j)|PS$_{N−1}^B$(i,j))

where "&" may indicate a bit-based logical AND operation and where "|" may indicate a bit-based logical OR operation.

At processing block 3240, the processing application may apply a second cleaning operation (e.g., similar to the cleaning operation described in processing block 3190) to the final map of static pixels to remove spurious false positives.

At processing block 3250, once a pixel has been identified as static and as part of a final static map, the processing application may begin processing accordingly. In this example, the processing application may ignore any motion vector associated with the static pixel during processing. That is, since the pixel is static, it may not need not to be compensated with respect to different location in an output frame. Instead, the processing application may copy pixel values from a first frame to the same coordinates in the output frame. Also, the processing application may prevent the static pixel from being overwritten by preventing a non-static pixel with an incorrect motion vector from being compensated to the static pixel location.

At processing block 3260, the process may terminate.

The sequence and numbering of blocks depicted in FIG. 3 is not intended to imply an order of operations to the exclusion of other possibilities. Those of skill in the art will appreciate that the foregoing systems and methods are susceptible of various modifications, variations, and alterations.

For example, in the embodiment described above, the processing application may generate a final static map of static pixels based on a color scheme using luma (Y) and chroma values ($C_b$, $C_r$). That is, as described above, the processing application may utilize each of these three values to perform computations (e.g., processing block 3020) to generate the final static map. However, this need not necessarily be the case. Embodiments of the present invention may be implemented utilizing other color schemes as well. For example, embodiments of present invention may be utilized to process video that may utilize an RGB color model as well. So, instead of processing based on luma (Y) and chroma values ($C_b$, $C_r$), similar calculations may be made by a processing application with respect to red, green, and blue values.

Figure 4:
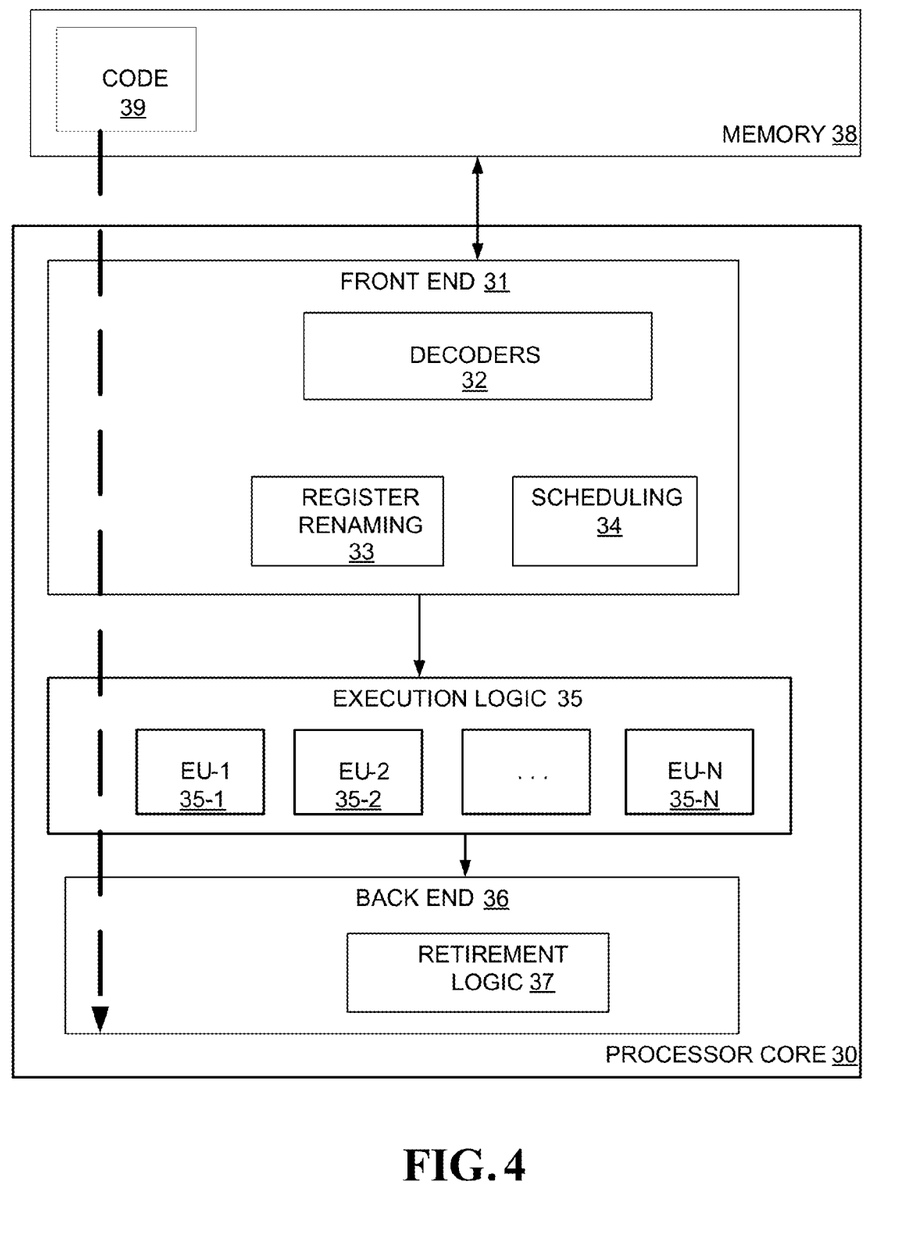
FIG. 4 is a block diagram of an example of a processor according to an embodiment.

FIG. 4 illustrates a processor core 30 according to one embodiment. The processor core 30 may be the core for any type of processor, such as a microprocessor, an embedded processor, a digital signal processor (DSP), a network processor, or other device to execute code. Although only one processor core 30 is illustrated in FIG. 4, a processing element may alternatively include more than one of the processor core 30 illustrated in FIG. 4. The processor core 30 may be a single-threaded core or, for at least one embodiment, the processor core 30 may be multithreaded in that it may include more than one hardware thread context (or "logical processor") per core.

FIG. 4 also illustrates a memory 38 coupled to the processor 30. The memory 38 may be any of a wide variety of memories (including various layers of memory hierarchy) as are known or otherwise available to those of skill in the art. The memory 38 may include one or more code 39 instruction(s) to be executed by the processor 30 core. The processor core 30 follows a program sequence of instructions indicated by the code 39. Each instruction may enter a front end portion 31 and be processed by one or more decoders 32. The decoder 32 may generate as its output a micro operation such as a fixed width micro operation in a predefined format, or may generate other instructions, microinstructions, or control signals which reflect the original code instruction. The illustrated front end 31 also includes register renaming logic 33 and scheduling logic 34, which generally allocate resources and queue the operation corresponding to the convert instruction for execution.

The processor 30 is shown including execution logic 35 having a set of execution units 35-1 through 35-N. Some embodiments may include a number of execution units dedicated to specific functions or sets of functions. Other embodiments may include only one execution unit or one execution unit that can perform a particular function. The illustrated execution logic 35 performs the operations specified by code instructions.

After completion of execution of the operations specified by the code instructions, back end logic 36 retires the instructions of the code 39. In one embodiment, the processor 30 allows out of order execution but requires in order retirement of instructions. Retirement logic 37 may take a variety of forms as known to those of skill in the art (e.g., re-order buffers or the like). In this manner, the processor core 30 is transformed during execution of the code 39, at least in terms of the output generated by the decoder, the hardware registers and tables utilized by the register renaming logic 33, and any registers (not shown) modified by the execution logic 35.

Although not illustrated in FIG. 4, a processing element may include other elements on chip with the processor core 30. For example, a processing element may include memory control logic along with the processor core 30. The processing element may include I/O control logic and/or may include I/O control logic integrated with memory control logic. The processing element may also include one or more caches.

Figure 5:
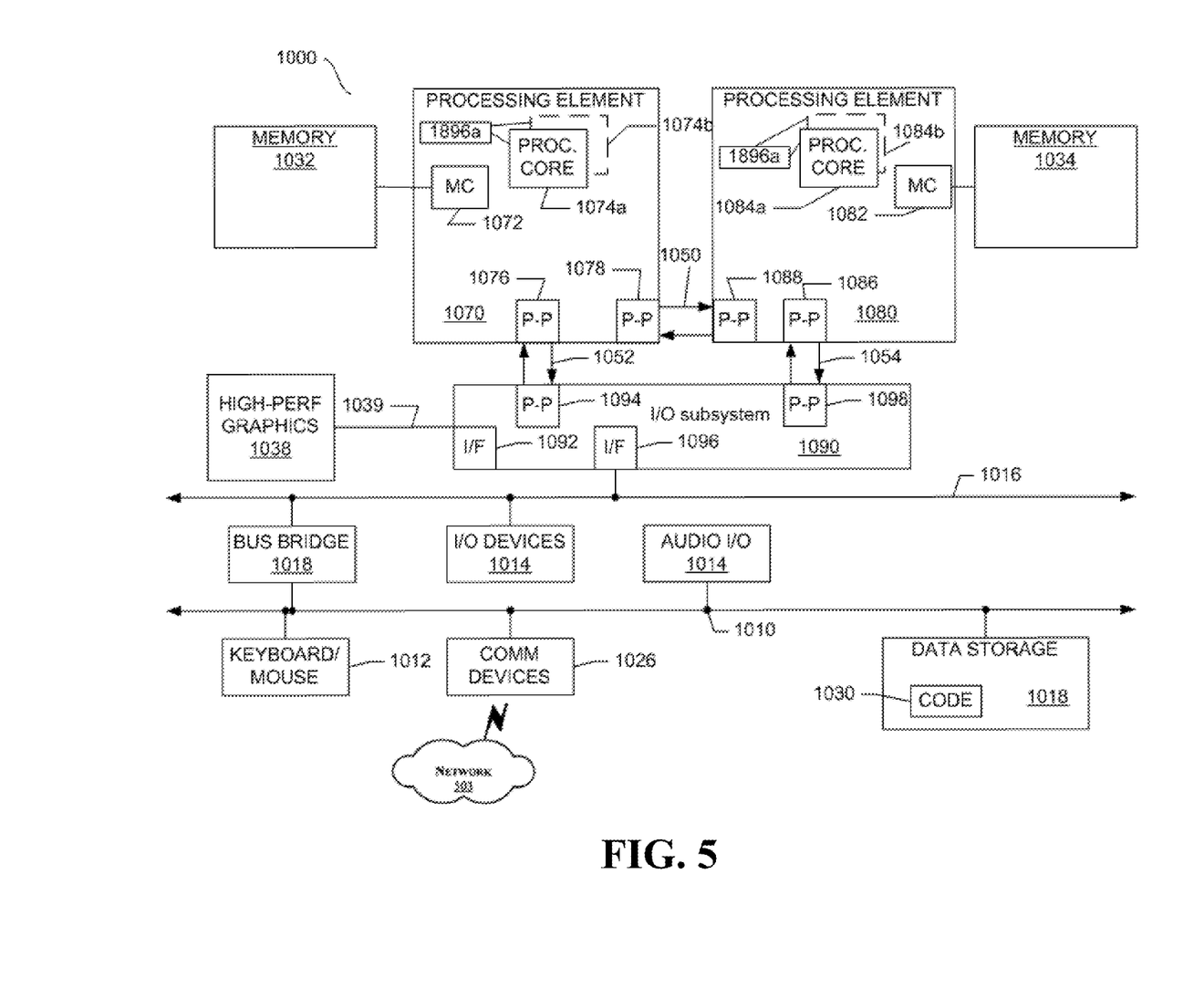
FIG. 5 is a block diagram of an example of a first system according to an embodiment.

Referring now to FIG. 5, shown is a block diagram of a system embodiment 1000 in accordance with an embodiment of the present invention. Shown in FIG. 5 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 4.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 5, various I/O devices 1014 may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network, 503), and a data storage unit 1018 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Figure 6:
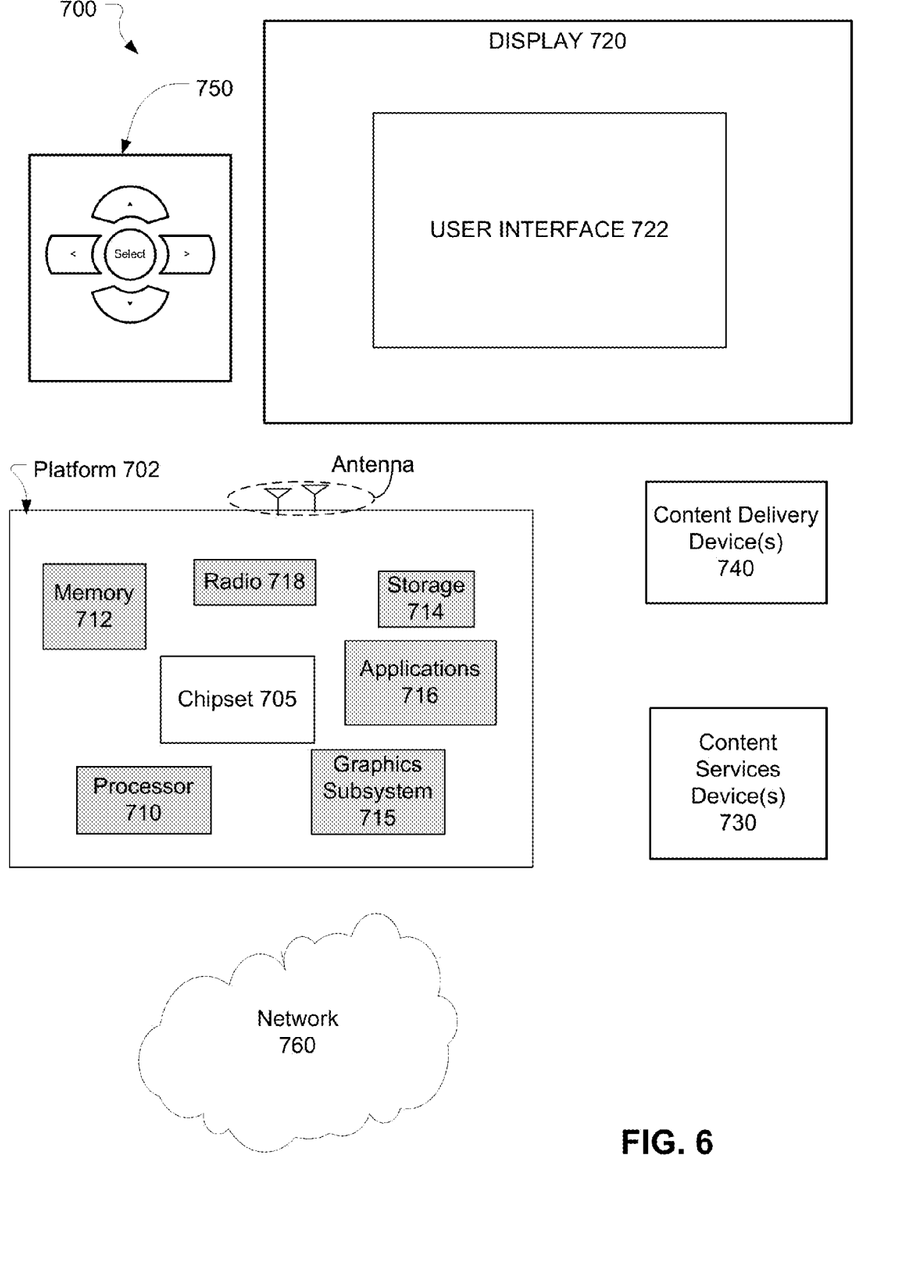
FIG. 6 is a block diagram of an example of a second system according to an embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
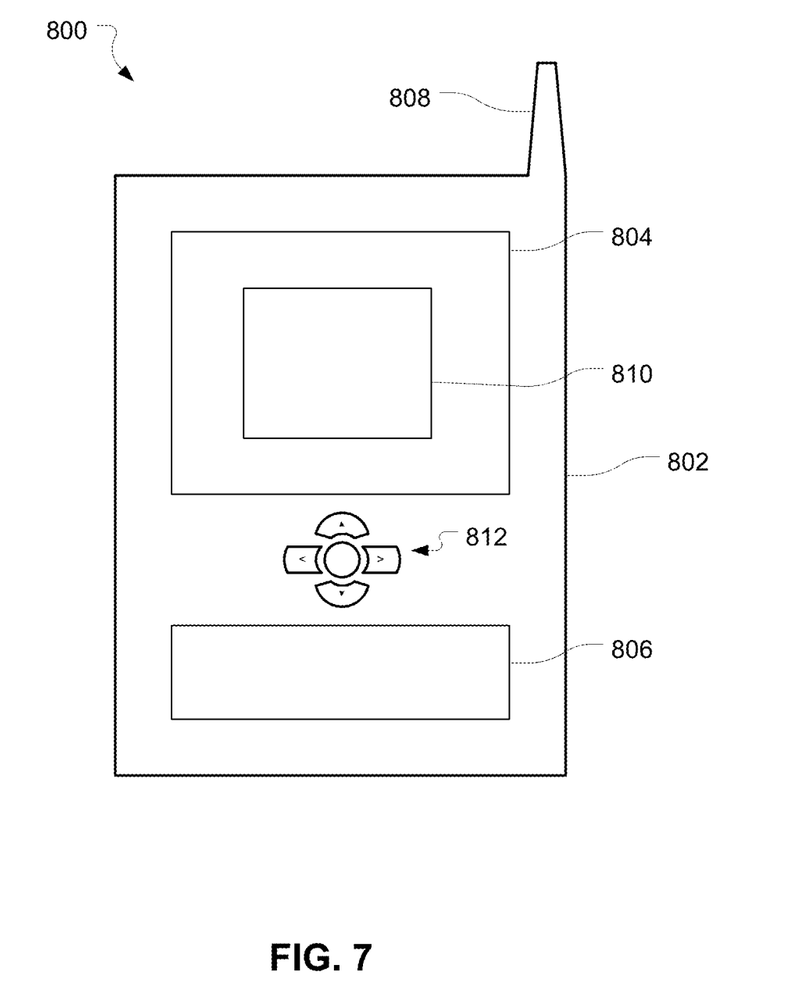
FIG. 7 is a block diagram of an example of a small form factor device according to an embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments may therefore provide for a system including a processing component and a difference value module to determine if a color component value of a pixel located at a pixel location remains constant between a first frame and a next frame by calculating a difference value of the color component. The system may also include a low-difference value module to determine if the pixel is a low-difference pixel by determining if the difference value of the color component is lower than a threshold value and a motion compensation comparison module to determine if a motion compensation error of the color component is large by comparing the motion compensation error of the color component with an error threshold of the color component.

Another embodiment may provide for a method including determining if a color component value of a pixel located at a pixel location remains constant between a first frame and a next frame, including calculating a difference value of the color component and determining if the pixel is a low-difference pixel, including determining if the difference value of the color component is lower than a threshold value. The method may also include calculating a motion-compensation error of the color component and determining if the motion compensation error of the color component is large, including comparing the motion compensation error of the color component with a error threshold of the color component.

Still another embodiment may provide for at least one computer readable storage medium comprising a set of instructions which, if executed by a processor, cause a computing device to determine if a color component value of a pixel located at a pixel location remains constant between a first frame and a next frame by calculating a difference value of the color component. The set of instructions may also cause a computing device to determine if the pixel is a low-difference pixel by determining if the difference value of the color component is lower than a threshold value, calculate a motion-compensation error of the color component, and determine if the motion compensation error of the color component is large by comparing the motion compensation error of the color component with a error threshold of the color component.

Embodiments may also provide for an apparatus, comprising a difference value module to determine if a color component value of a pixel located at a pixel location remains constant between a first frame and a next frame by calculating a difference value of the color component and a low-difference value module to determine if the pixel is a low-difference pixel by determining if the difference value of the color component is lower than a threshold value. The apparatus may also include a motion compensation comparison module to determine if a motion compensation error of the color component is large by comparing the motion compensation error of the color component with an error threshold of the color component.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system, comprising:
    a processing component;
    a difference value module to determine if a color component value of a pixel located at a pixel location remains constant between a first frame and a next frame by calculating a difference value of the color component;
    a low-difference value module to determine if the pixel is a low-difference pixel by determining if the difference value of the color component is lower than a threshold value;
    a motion compensation comparison module to determine if a motion compensation error of the color component is large by comparing the motion compensation error of the color component with an error threshold of the color component, and
    an overwriting module to prevent the pixel from being overwritten by preventing a non-static pixel with an incorrect motion vector from being compensated to a static pixel location.

2. The system of claim 1, further including:
    a motion vector module to ignore the motion vector associated with the pixel; and
    a pixel copy module to copy a pixel value associated with the pixel from the first frame to the next frame.

3. The system of claim 2, further including a map generation module to generate a map of static pixels including the pixel.

4. The system of claim 3, further including a cleaning operation module to apply a cleaning operation to the map of static pixels.

5. A method, comprising:
    determining if a color component value of a pixel located at a pixel location remains constant between a first frame and a next frame, including calculating a difference value of the color component;
    determining if the pixel is a low-difference pixel, including determining if the difference value of the color component is lower than a threshold value;
    calculating a motion-compensation error of the color component;
    determining if the motion compensation error of the color component is large, including comparing the motion compensation error of the color component with an error threshold of the color component, and
    preventing the pixel from being overwritten by preventing a non-static pixel with an incorrect motion vector from being compensated to a static pixel location.

6. The method of claim 5, further including:
    ignoring the motion vector associated with the pixel; and
    copying a pixel value associated with the pixel from the first frame to the next frame.

7. The method of claim 5, wherein the threshold value is based on a maximum gradient found in a neighborhood of pixels including the pixel.

8. The method of claim 5, wherein determining if the difference value of the color component is lower than a threshold value includes determining if the difference value is lower than the threshold value with respect to the first frame, and determining if the difference value is lower than the threshold value with respect to a previous frame.

9. The method of claim 5, further including generating a map of static pixels including the pixel.

10. The method of claim 9, further including applying a cleaning operation to the map of static pixels.

11. The method of claim 9, wherein generating the map of static pixels is based on a first map of potentially static pixels based on the first frame, and a second map of potentially static pixels based on a previous frame.

12. The method of claim 9, wherein generating the map of static pixels is based on a plurality of maps of potentially static pixels based on the first frame, and a plurality of maps of potentially static pixels based on a previous frame.

13. The method of claim 12, wherein the plurality of maps of potentially static pixels based on the first frame includes a forward map of potentially static pixels, and a backward map of potentially static pixels.

14. The method of claim 12, wherein the plurality of maps of static pixels based on the previous frame includes a forward map of potentially static pixels, and a backward map of potentially static pixels.

15. At least one non-transitory computer readable storage medium comprising a set of instructions which, if executed by a processor, cause a computing device to:
    determine if a color component value of a pixel located at a pixel location remains constant between a first frame and a next frame by calculating a difference value of the color component;
    determine if the pixel is a low-difference pixel by determining if the difference value of the color component is lower than a threshold value;
    calculate a motion-compensation error of the color component;
    determine if the motion compensation error of the color component is large by comparing the motion compensation error of the color component with an error threshold of the color component, and
    prevent the pixel from being overwritten by preventing a non-static pixel with an incorrect motion vector from being compensated to a static pixel location.

16. The medium of claim 15, wherein, if executed, the instructions cause a computing device to:
    ignore the motion vector associated with the pixel; and
    copy a pixel value associated with the pixel from the first frame to the next frame.

17. The medium of claim 15, wherein the threshold value is to be based on a maximum gradient found in a neighborhood of pixels including the pixel.

18. The medium of claim 15, wherein determining if the difference value of the color component is lower than a threshold value is to include determining if the difference value is lower than the threshold value with respect to the first frame, and determining if the difference value is lower than the threshold value with respect to a previous frame.

19. The medium of claim 15, wherein, if executed, the instructions cause a computing device to generate a map of static pixels including the pixel.

20. The medium of claim 19, wherein, if executed, the instructions cause a computing device to apply a cleaning operation to the map of static pixels.

21. The medium of claim 19, wherein generating the map of static pixels is to be based on a first map of potentially static pixels based on the first frame, and a second map of potentially static pixels based on a previous frame.

22. The medium of claim 19, wherein generating the map of static pixels is to be based on a plurality of maps of potentially static pixels based on the first frame, and a plurality of maps of potentially static pixels based on a previous frame.

23. The medium of claim 19, wherein the plurality of maps of potentially static pixels based on the first frame is to include a forward map of potentially static pixels, and a backward map of potentially static pixels.

24. The medium of claim 22, wherein the plurality of maps of static pixels based on the previous frame is to include a forward map of potentially static pixels, and a backward map of potentially static pixels.

25. An apparatus, comprising:
a difference value module to determine if a color component value of a pixel located at a pixel location remains constant between a first frame and a next frame by calculating a difference value of the color component;
a low-difference value module to determine if the pixel is a low-difference pixel by determining if the difference value of the color component is lower than a threshold value;
a motion compensation comparison module to determine if a motion compensation error of the color component is large by comparing the motion compensation error of the color component with an error threshold of the color component, and
an overwriting module to prevent the pixel from being overwritten by preventing a non-static pixel with an incorrect motion vector from being compensated to a static pixel location.

26. The apparatus of claim 25, further including:
a motion vector module to ignore the motion vector associated with the pixel; and
a pixel copy module to copy a pixel value associated with the pixel from the first frame to the next frame.

27. The apparatus of claim 25, further including a map generation module to generate a map of static pixels including the pixel.

28. The apparatus of claim 26, further including a cleaning operation module to apply a cleaning operation to the map of static pixels.

* * * * *

UNITED STATES PATENT AND TRADEMARK OFFICE
CERTIFICATE OF CORRECTION

PATENT NO. : 9,609,319 B2
APPLICATION NO. : 13/543786
DATED : March 28, 2017
INVENTOR(S) : Ahuja et al.

Page 1 of 1

It is certified that error appears in the above-identified patent and that said Letters Patent is hereby corrected as shown below:

At Column 19, Claim number 23, Line number 13, delete "claim 19," and insert --claim 22,--

Signed and Sealed this
Nineteenth Day of June, 2018

Andrei Iancu
*Director of the United States Patent and Trademark Office*